May 26, 1942.  C. W. HANSELL  2,284,423
MEASURING INSTRUMENT
Filed June 1, 1940
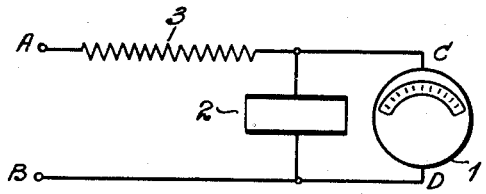
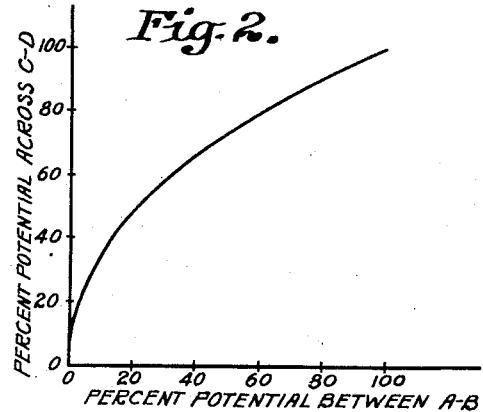
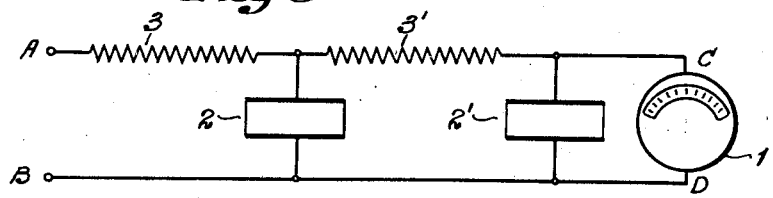
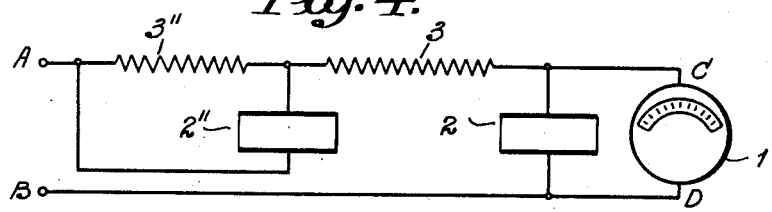
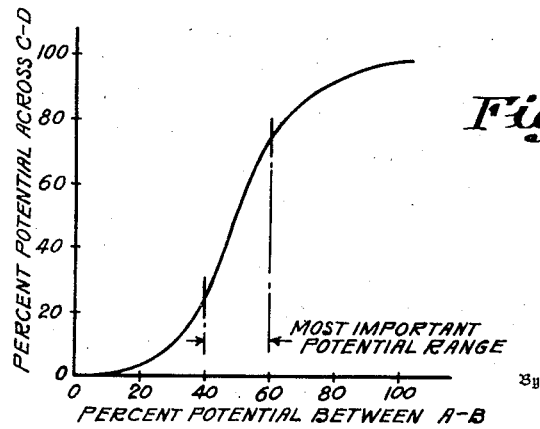
Inventor
Clarence W. Hansell,
By H. S. Grover
Attorney Patented May 26, 1942

2,284,423

UNITED STATES PATENT OFFICE 2,284,423

MEASURING INSTRUMENT

Clarence W. Hansell, Port Jefferson, N. Y., assignor to Radio Corporation of America, a corporation of Delaware Application June 1, 1940, Serial No. 338,324

4 Claims. (Cl. 171—95)

This invention relates to a new and novel electrical measuring instrument by means of which certain kinds of measurements may be facilitated.

One object of the invention is to obtain readings from an ordinary electrical measuring instrument over a much larger ratio of potentials or currents than is ordinarily possible. By this means, it becomes possible to calibrate the scale of an instrument in decibels and to show a much larger range of decibels on one scale.

A feature of the invention is the combination of a measuring instrument with fixed and automatically variable resistances in a manner to modify the response of the instrument to potentials or currents applied to the combination.

The invention may be understood by referring to the accompanying drawing, in which:

Fig. 1 is a circuit diagram of one form of the invention;

Fig. 2 is a curve or graph illustrating the characteristics of the arrangement of Fig. 1;

Fig. 3 is a circuit diagram of another form of the invention;

Fig. 4 is a circuit diagram of still another form of the invention; and

Fig. 5 is a curve or graph illustrating the characteristics of the arrangement of Fig. 4.

Referring now to Fig. 1 of the drawing, a voltmeter 1 is connected with a source of electrical potential A—B, which is to be measured, through a combination of an automatically variable resistance 2 and a fixed multiplier resistance 3.

The automatically variable resistance 2 may be made of any one of a number of materials having the property of rapidly decreasing resistance with increasing potential across it. There are a number of commercial devices available which have this property, including barrier layer electric current rectifiers and photocells. However, for the arrangement of Fig. 1, I prefer to employ as an automatically variable resistor a material developed by K. B. McEachron of the General Electric Company for use in lightning arresters. This material, which is sold under the trade name of Thyrite is described in the following references:

1. Thyrite; A New Material for Lightning Arresters by K. B. McEeachron, General Electric Review, February 1930.
2. The Calculation of Circuits Containing Thyrite by Theodore Brownlee, General Electric Review, April and May 1934.

In the operation of the arrangement of Fig. 1 the points A, B may be connected to a source of potential. Then, if we assume that the potential is made zero and then increased to the maximum value permitted by the instrument, the deflection of the instrument will first be determined solely by the value of the resistance 3, the internal resistance of the instrument and the instrument sensitivity. That is, for low values of potential across points A, B and across the instrument at C, D, current flowing in the Thyrite block 2 will be negligible. However, as the potential across A, B and C, D increases, current through the Thyrite will increase at a much more rapid rate than the increase in potential across the Thyrite. The law of current variation with variation in potential across the Thyrite is given by the approximate formula—

$$I = KE^{3.57}$$

where
I = current through the Thyrite
E = potential across the Thyrite
K = a constant dependent upon the Thyrite dimensions.

Because the current through the Thyrite increases much more rapidly than the potential across it, the division of current, through resistance 3, between the Thyrite and the instrument, will change as the potential across A, B is increased. At high potentials, the current through the Thyrite may be many times larger than the current through the instrument. As a result, instead of the potential across the instrument being proportional to the potential across A, B, as it would be in ordinary measuring circuits, it may be as represented by the curve of Fig. 2.

The overall result is to increase the significance of low potentials as indicated by the instrument and to decrease the significance of high potentials. Consequently, the instrument may be calibrated with a relatively large number of decibels on one scale.

The range of decibels shown on the one scale may be extended by means of cascade arrangements of resistance and Thyrite such as that indicated in Fig. 3.

An outstanding virtue of the arrangements of Figs. 1 and 3 is that the Thyrite tends to protect the instruments from being destroyed due to accidental application of excessive potentials. Many instruments are deliberately designed to withstand potentials of at least double the full scale value without destruction. In the case of Fig. 1, for example, in order for double potential to be obtained on the instrument, it would be necessary to apply nearly twelve times as much potential across A, B as would be required to give full scale deflection of the instrument. In the case of Fig. 3, the overvoltage permitted without endangering the instrument might be much greater. This would be a great aid to economy in the use of instruments in schools and laboratories where destruction of instruments due to erroneous application of excessive potentials is frequent.

Automatically variable resistances such as Thyrite may also be employed to spread out or emphasize some particular range of potentials as shown on the scale of the instrument. Suppose, for example, that it is desired to spread out the length of scale on the instrument corresponding to half of maximum deflection potential. This would correspond approximately to a relation between applied potential and instrument potential as illustrated in Fig. 5.

To obtain a response qualitatively like that of Fig. 5 we may employ an arrangement similar to that illustrated in Fig. 4. In this arrangement, the resistance 3 and Thyrite 2 act to suppress or round off the higher applied potentials from reaching the instrument, in the same manner as in the arrangement of Fig. 1. At the same time, resistance 3″ and Thyrite 2″ serve to decrease potentials reaching the instrument when the applied potentials are low. The overall result is an instrument response to potentials applied across A, B which is qualitatively similar to that illustrated in Fig. 5.

In applying Thyrite according to the invention it should be taken into account that its resistance varies to some extent with temperature and that the material, itself, is not a very good conductor of heat so that its internal temperature may be higher than its surface temperature when power is being dissipated in it. Consequently, it is preferable to employ the Thyrite in the form of rather thin blocks or sheets of fairly large area having metal coatings on the surfaces. The thin blocks are then bolted together with metal plates of larger area and the whole assembly mounted to provide for free air circulation so that the metal plates act as air cooling fins. The material has been manufactured in thicknesses down to about $\frac{1}{16}$ inch. The most convenient form is that which is shaped like a washer, that is, it is a flat disc with a hole at the center which can be assembled with metal fins and held together by one insulated bolt. Connections may conveniently be made through the metal cooling fins.

What is claimed is:

1. A voltmeter circuit including a current responsive meter having a scale compressed at both ends with respect to the center, a pair of multiplying resistances connected in series with said meter and a shunt across said meter, said shunt having a resistance which decreases with increasing potential applied thereacross whereby the sensitivity of said meter is decreased for large potentials applied to said circuit, one of said multiplying resistors having a resistance which decreases with increase in voltage thereacross for decreasing the sensitivity of said meter for small potentials applied to said circuit.

2. A voltmeter circuit including a current responsive meter having a scale compressed at both ends with respect to the center, a pair of multiplying resistances connected in series with said meter and a shunt across said meter, said shunt having a negative potential coefficient of resistance whereby the sensitivity of said meter is decreased for large applied potentials, one of said multiplying resistances having a negative potential coefficient of resistance for decreasing the sensitivity of said meter for small applied potentials.

3. A voltmeter circuit including a current responsive meter, a multiplying resistance connected in series with said meter and a shunt across said meter, said shunt having a negative potential coefficient of resistance whereby the sensitivity of said meter is decreased for large applied potentials, at least a part of said multiplying resistance having a negative potential coefficient of resistance for decreasing the sensitivity of said meter for small applied potentials.

4. A voltmeter circuit including a current responsive meter, a pair of multiplying resistances connected in series with said meter and a shunt across said meter, said shunt having a negative potential coefficient of resistance whereby the sensitivity of said meter is decreased for large applied potentials, a second shunt across one of said multiplying resistances, said second shunt having a negative potential coefficient of resistance whereby said shunted multiplying resistance varies in value between predetermined elements for decreasing the sensitivity of said meter for small applied potentials.

CLARENCE W. HANSELL.